(12) United States Patent
Kemmner et al.

(10) Patent No.: US 7,225,610 B2
(45) Date of Patent: Jun. 5, 2007

(54) PROCESS FOR OPERATING A COMBUSTION ENGINE

(75) Inventors: Markus Kemmner, Unterensingen (DE); Thomas Koch, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/169,791

(22) Filed: Jun. 30, 2005

(65) Prior Publication Data

US 2006/0010855 A1 Jan. 19, 2006

(30) Foreign Application Priority Data

Jun. 30, 2004 (DE) .................. 10 2004 031 502

(51) Int. Cl.
*F01N 3/00* (2006.01)
(52) U.S. Cl. ................ 60/286; 60/274; 60/285; 60/295
(58) Field of Classification Search .......... 60/274, 60/284, 285, 295, 297, 286; 123/90.15, 90.19, 123/198 F, 481
See application file for complete search history.

(56) References Cited

U.S. PATENT DOCUMENTS

| 3,220,392 | A | * | 11/1965 | Cummins ............... 123/321 |
| 5,967,115 | A | * | 10/1999 | Konopka et al. ......... 123/322 |
| 6,170,474 | B1 | * | 1/2001 | Israel .................. 123/568.14 |
| 6,325,043 | B1 | * | 12/2001 | Meistrick et al. ........ 123/321 |
| 6,925,976 | B2 | * | 8/2005 | Israel et al. ............ 123/90.12 |
| 6,981,370 | B2 | * | 1/2006 | Opris et al. ............... 60/311 |
| 7,028,652 | B2 | * | 4/2006 | Iwashita et al. ........ 123/90.15 |

FOREIGN PATENT DOCUMENTS

| DE | 40 42 048 A1 | 7/1991 |
| DE | 41 17 676 A1 | 12/1991 |
| DE | 43 27 086 C1 | 2/1995 |
| DE | 102 50 121 A1 | 5/2003 |
| DE | 698 13 934 T2 | 5/2004 |
| EP | 1 289 647 A1 | 2/2004 |
| EP | 1 389 674 A1 | 2/2004 |
| JP | 2002295215 A | 10/2002 |
| WO | WO 01/29383 A1 | 4/2001 |
| WO | WO 03/104622 A1 | 12/2003 |

OTHER PUBLICATIONS

German Search Report dated Jul. 5, 2006 including English translation of pertinent portion (Nine (9) pages).

* cited by examiner

*Primary Examiner*—Binh Q. Tran
(74) *Attorney, Agent, or Firm*—Crowell & Moring LLP

(57) ABSTRACT

A method of operating an internal-combustion engine (1) which has at least one cylinder (10,20,30,40,50,60) with a combustion chamber (17,27,37,47,57,67) assigned to it, in the cylinder (10,20,30,40,50,60), a piston (11,21,31,41,51, 61) carries out an oscillating movement between a lower dead center and an upper dead center. In the combustion chamber (17,27,37,47,57,67) a fuel-air mixture is ignited. Exhaust gas forming during the combustion of the fuel-air mixture in the combustion chamber (17,27,37,47,57,67) is fed to an exhaust pipe (5), and the exhaust gas is purified in an exhaust treatment device (6) arranged in the exhaust pipe (5). For the regeneration of the exhaust treatment device (6), the temperature in the exhaust pipe (5) is increased in that an outlet valve (16, 26, 36, 46, 56, 66) opening up the combustion chamber (17, 27, 37, 47, 57, 67) in the direction of the exhaust pipe (5) is opened in the range of the upper compression dead center of the piston (11, 21, 31, 41, 51, 61).

18 Claims, 1 Drawing Sheet

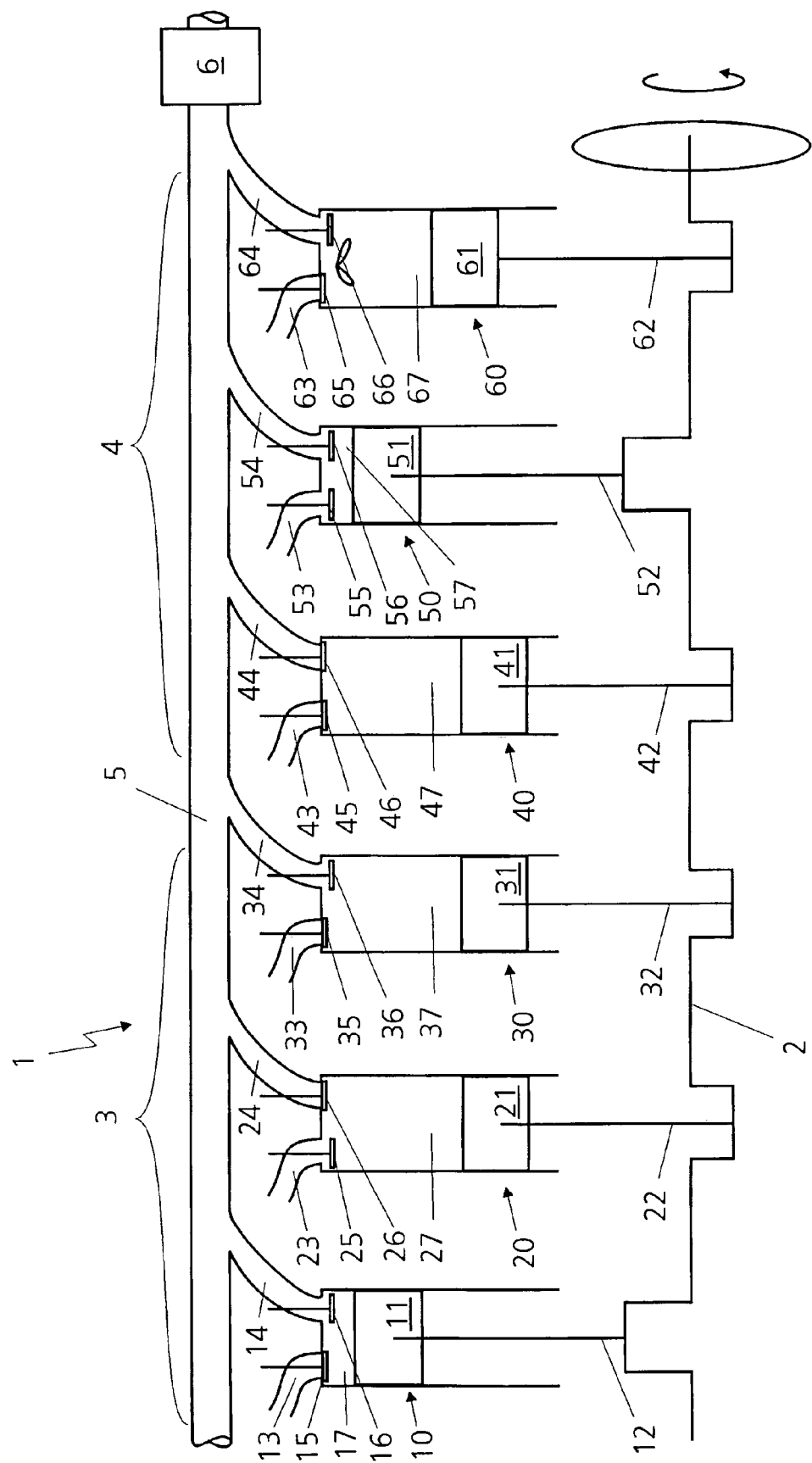

PROCESS FOR OPERATING A COMBUSTION ENGINE

This application claims the priority of DE 10 2004 031502.7, filed Jun. 30, 2004, the disclosure of which is expressly incorporated by reference herein.

BACKGROUND AND SUMMARY OF THE INVENTION

The invention relates to a method of operating an internal-combustion engine which has at least one cylinder with a combustion chamber assigned to it.

A method of the above-mentioned type is known, for example, from German Patent Document DE 102 50 121 A1 wherein the exhaust valve is opened during the compression stroke carried out by the piston, so that unburnt fuel and air is released from the cylinder. The fuel oxidizes in the exhaust treatment device with the air which leads to the release of heat thereby generating a desired temperature increase in the exhaust treatment device. This metered addition of fuel into the exhaust pipe is, however, not completely without problems and requires a very effective control in order to avoid any disadvantageous effects.

From International Patent Document WO 03/104622 A1, a control method is known for regenerating a particle filter in an exhaust system in the case of which the timing of the charge cycle valves is to be changed during the intake stroke in order to increase the temperature in the exhaust pipe to a temperature which is suitable for regenerating the particle filter. However, by means of the solution described therein, the achieved effects are insufficient.

International Patent Document WO 01/29383 A1 describes a method of influencing the exhaust gas temperature in an internal-combustion engine in which, in order to raise the exhaust gas temperature, the combustion chamber exhaust valve is opened earlier. For this purpose, conventional camshaft adjusting devices are used by means of which an adjustment of the camshaft by typically approximately 10 to 20° can be achieved. The described method is only suitable for internal-combustion engines with a variable compression ratio, which, however, generates very high expenditures and thus extremely high costs.

Japanese Patent Document JP 2002295215 A describes a system for increasing the exhaust gas temperature of an internal-combustion engine where the timing of the exhaust valve can be adjusted by a crankshaft angle of approximately 20 to 40° in the early direction. In this case, the exhaust valve is opened in the compression stroke.

In European Patent Document EP 1 389 674A1, a strategy is described according to which the exhaust valve is opened during the intake stroke in order to take in not only cold fresh air but also again take in already burnt hot gas.

However, all of the mentioned methods and systems are not capable of producing a temperature of the exhaust gas leaving the combustion chamber sufficient, for example, for the regeneration of a particle filter.

It is therefore an object of the present invention to provide a method for operating an internal-combustion engine by which, by means of simple devices, an increase of the temperature existing in the exhaust pipe can be achieved which is sufficient for the regeneration of an exhaust treatment device.

In the case of the method according to the invention, the exhaust valve is opened in the area of the upper compression dead center of the piston and thus at a considerably earlier point in time than normally, whereby the hot compressed air or the exhaust gases can escape from the combustion chamber into the exhaust pipe, raise the temperature and in this manner warm up the exhaust treatment device. This permits a regeneration of the exhaust treatment device.

The method according to the invention can advantageously be implemented by means of very simple, for example, hydraulic or mechanical devices, because a corresponding opening of the outlet valve can be carried out by known devices which may already exist on the internal-combustion engine.

It was found to be particularly advantageous with respect to the heat fed into the exhaust pipe for the exhaust valve to be opened at the earliest 40° before and at the latest 40° after the upper compression dead center of the piston.

A synchronization of the ignition of the fuel-air mixture with the opening of the exhaust valve can occur when the fuel-air mixture in the cylinder is ignited at the earliest 40° before the upper compression dead center of the piston and at the latest 40° after the upper compression dead center of the piston.

In the case of multi-cylinder internal-combustion engines, a particularly advantageous embodiment of the method can consist of the fact that at least one of the cylinders is operated in an unfired manner. In this case the temperature in the exhaust pipe is increased because the exhaust valve is opened in the area of the upper compression dead center of the piston, and at least one of the cylinders being operated in a fired manner. In the case of this cylinder, the exhaust valve is held during the compression stroke essentially in its closed position. The air in the unfired cylinders is compressed to a higher temperature and in the area of the upper dead center of the piston, is guided into the exhaust pipe.

By means of such a method, it becomes possible to simultaneously regenerate the exhaust treatment device and nevertheless operate the internal-combustion engine such that it provides sufficient useful power, for example, for operating a motor vehicle. This result in a temperature in the exhaust pipe which is the higher when more cylinders are unfired and are operated with the opening of the exhaust valve according to the invention in the range of the upper compression dead center of the piston. In this case, the fired cylinders have to yield a greater power than in an operating mode in which all cylinders are fired, which advantageously results in a further increase of the exhaust gas temperature.

Other objects, advantages and novel features of the present invention will become apparent from the following detailed description of the invention when considered in conjunction with the accompanying drawings.

BRIEF DESCRIPTION OF THE DRAWING

The single FIGURE illustrates a multi-cylinder internal-combustion engine whose cylinders are operated in different modes.

DETAILED DESCRIPTION OF THE DRAWING

An internal-combustion engine constructed in a manner known per se and operating according to the Diesel or Otto principle in the illustrated embodiment has a total of six cylinders 10, 20, 30, 40, 50 and 60, in which the respective pistons 11, 21, 31, 41, 51 and 61 carry out oscillating movements between a lower dead center not indicated in detail and an upper dead center. The pistons 11-61 are connected with a crankshaft 2 of the internal-combustion engine 1 by means of respective connecting rods 12, 22, 32, 42, 52 and 62.

Inlet ports 13, 23, 33, 43, 53 and 63 assigned to each cylinder 10-60 as well as respective outlet ports 14, 24, 34, 44, 54 and 64 are situated in the cylinder head of the internal combustion engine 1, which is not shown. Furthermore, each cylinder 10-60 has respective intake valves 15, 25, 35, 45, 55 and 65 as well as respective outlet valves 16, 26, 36, 46, 56 and 66 which control the entering of air or of a fuel-air mixture by way of the inlet ports 13-63 into respective combustion chambers 17, 27, 37, 47, 57 and 67 of the cylinders 10-60 and the discharge of exhaust gas from the combustion chambers 17-67 by way of the outlet ports 14-64 respectively. The control of the intake valves 15-65 and of the outlet valves 16-66 takes place by way of camshafts which are not shown. Naturally, each cylinder 10-60 may have more than one intake valve 15-65 and/or more than one outlet valve 16-66.

In the present case, the internal-combustion engine 1 has a total of six cylinders 10-60; however, any other number of cylinders may also be provided. Furthermore, it would be conceivable to arrange the cylinders 10-60 in a V-shape or another suitable construction and not, as illustrated, in an in-line construction.

The internal-combustion engine 1 can be operated according to a method described in the following, for which the cylinders 10-60 are divided into two cylinder groups, specifically a first cylinder group 3 consisting of cylinders 10, 20 and 30 as well as a second cylinder group 4 consisting of cylinders 40, 50 and 60. In this case, the cylinders 10-30 of the first cylinder group 3 are not fired; that is, no fuel-air mixture is introduced into them and no combustion takes place. Instead, the outlet valves 16, 26 and 36 are opened in the range of the upper compression dead center of the pistons 11, 21 and 31, which, in the manner of an example, is shown for the outlet valve 16 of the cylinder 10. It is generally provided that the outlet valves 16-36 be opened at the earliest 40° before and at the latest 40° after the upper compression dead center of the piston 11-31, in which case their closing can be delayed until they are normally closed for terminating the exhaust stroke. An opening phase of the outlet valves 16-36 is particularly effective.

As a result of this approach, the air compressed inside the combustion chambers 17, 27 and 37 and thereby heated is guided into the respective outlet port 14, 24, 34 and as a result into an exhaust pipe 5 of the internal-combustion engine 1 which adjoins all outlet ports 14-64. This leads to a considerable increase of the temperature inside the exhaust pipe 5 which is sufficient for regenerating an exhaust treatment device 6 arranged in the exhaust pipe 5. Depending on the construction type of the internal-combustion engine 1, the exhaust treatment device 6 may, for example, be a particle filter or an $NO_x$ storage catalyst. The process can be initiated by an electronic control device which is not shown and which detects the required regeneration of the exhaust treatment device 6.

The outlet valves 26 and 36 of the cylinders 20 and 30 are also opened in the described manner in the range of the upper compression dead center of the pertaining piston 21 and 31, in which case the cylinders 20 and 30 in the illustrated position are, however, in a different condition. Thus, in the case of cylinder 20, the intake valve 25 is opened and, in the case of the cylinder 30, the outlet valve 36 is opened; however, the pistons 21 and 31 are each in the range of their lower dead center.

The cylinders 40, 50 and 60 are operated in a conventional manner, that is, in a fired manner. In this case, the piston 41 of the cylinder 40 is in its lower dead center and is at the start of its compression stroke. The intake valve 45 and the outlet valve 46 of the cylinder 40 are closed. The piston 51 of the cylinder 50 is at its upper dead center, the intake valve 55 as well as the outlet valve 56 being open. The cylinder 60 is shown during the expansion stroke of the piston 61 during which the fuel-air mixture is ignited and the outlet valve 66 opens as a result of the controlling of the camshaft at a customary point in time and exclusively with the goal of the exhaust and refill.

When selecting the cylinders 10-60 for the fired and unfired operation respectively, attention should be paid to a firing sequence which is as uniform as possible, the spatial arrangement of the latter being less important.

The method described with reference to the drawing, in the case of which generally at least one of the cylinders 10 to 60 is operated in an unfired manner, in the case of this at least one cylinder 10-60, the temperature of the exhaust gas being increased in that the pertaining outlet valve 16-66 is opened in the range of the upper compression dead center of the piston 11-61, and at least one of the cylinders 10-60 being operated in a fired manner, in the case of this cylinder 10-60, the outlet valve 16-66 remaining closed during the compression stroke, represents a special implementation of a method according to which, in a general fashion, for the regeneration of the exhaust treatment device 6, the temperature of the exhaust gas is increased in that the outlet valve 16-66 opening up the combustion chamber 17-67 in the direction of the exhaust pipe 5 is opened in the range of the upper compression dead center of the piston 11-61. This means that all cylinders 10-60 of the internal-combustion engine 1 can be fired; that is, can be operated by means of the introduction of a fuel-air mixture and its combustion and their outlet valves 16-66 can be opened at the above-mentioned point in time. This also means that it becomes possible to operate all cylinders 10-60 in an unfired manner and to open their outlet valves 16-66 at the above-mentioned point in time, for example, during a braking operation. Also included are all combinations between a fired and unfired operation of any number of the individual cylinders 10-60. Depending on the load condition of the internal-combustion engine 1, the number of the fired and unfired cylinders 10-60 can be varied.

When at least one of the outlet valves 16-66 of at least one fired cylinder 10-60 is opened in the range of the upper compression dead center of the pertaining piston 11-16, it is useful to ignite the fuel-air mixture in the cylinder 10-66 at the earliest 40° before the upper compression dead center of the piston 11-61 and at the latest 40° after the upper compression dead center of the piston 11-61. In principle, the outlet valve 16-66 can be opened before or after the start of the ignition or simultaneously with the start of the ignition. It is conceivable to open the outlet valve 16-66 after the end of the combustion, preferably immediately after the end of the combustion. The heating-up of the exhaust gas is the greater, the earlier the outlet valve 16-66 is opened, because in this manner, a considerable part of the useful work is not implemented in the respective cylinder 10-60.

It is particularly meaningful to carry out the described method during the idling or at points in time of a low load or a partial load of the internal-combustion engine 1 because, specifically in these operating ranges, often no sufficient exhaust gas temperature or temperature in the exhaust pipe 5 is available for the regeneration of the exhaust treatment device 6. This can basically be carried out during the regular driving operation, but an emergency regeneration operation can also be carried out without the output of an engine load if required by the condition of the exhaust treatment device 6. When the load of the internal-combustion engine 1 increases, it is therefore useful because of the rising temperature within the exhaust pipe 5 to operate a smaller number of cylinders 10-60 unfired. In this case, when the load conditions of the internal-combustion engine 1 change, it may be meaningful to adapt the respective operating strategy to the load condition. For the implementation or, if required, the adaptation of the operating strategy, a normally already existing control unit which is to be applied, if required, can be used.

The described method can be combined with a recirculation of exhaust gases known per se because an opening of an exhaust gas recirculation valve leads to a further increase of the temperature within the exhaust pipe. Combinations with other methods known per se for increasing the temperature, such as the closing of a brake flap behind the exhaust gas turbocharger turbine, the bypassing of a charge air cooler, the heating of the intake air or a later injection, are also conceivable.

In addition, it may be provided in the case of each operating mode that during the phase of the regeneration of the exhaust treatment device 6, additional measures are implemented for regenerating the exhaust treatment device 6, such as the injection of fuel, urea or the like.

Another conceivable method of operation may consist of injecting, after the opening of the outlet valve 16-66, when the temperature has already fallen within the cylinders 10-60, for example, to a temperature of approximately 400-500° C., fuel into the unfired, towed cylinders 10-60. In this temperature range, an ignition of the fuel can be largely avoided; however, simultaneously a very good evaporation and processing of the fuel is achieved. This fuel can increase the temperature in an oxidation catalyst, which is not shown and is connected in front of the exhaust treatment device 6, such that the exhaust gas temperature is sufficient for regenerating the exhaust treatment device 6, whereby the feeding of fuel in an external HC metering unit can be eliminated. An additional advantage of this solution consists of the fact that the fuel is injected into the cylinders 10-60 at a point in time at which the piston 11-61 is still relatively close to the upper dead center, where the wetting of the cylinder wall and the resulting problems concerning oil dilution, etc. can be largely avoided. Here, it is not important whether the outlet valve 16-66 is open or already closed again at the point in time of the injection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of operating an internal-combustion engine which has a plurality of cylinders, each of which has an associated combustion chamber and a piston moveable in each cylinder for carrying out an oscillating movement between a lower dead center and an upper dead center in the combustion chamber, comprising operating at least one of the cylinders without supplying a fuel-air mixture thereto, opening an outlet valve of said at least one of the cylinders when a piston of said at least one chamber is proximal to an upper compression dead center in order to increase a temperature in the exhaust pipe, supplying the fuel-air mixture to other of the cylinders, and feeding compressed air from said at least one of the cylinders and exhaust gas formed during combustion of the fuel-air mixture in the other of the cylinders to an exhaust pipe associated with an exhaust treatment device.

2. Method according to claim 1, wherein the outlet valve is opened at the earliest 40° before and at the latest 40° after the upper compression dead center of the piston.

3. Method according to claim 1, wherein the fuel-air mixture in the cylinder is ignited at the earliest 40° before the upper compression dead center of the piston and at the latest 40° after the upper compression dead center of the piston.

4. Method according to claim 1, wherein the outlet valve is opened before the start of the ignition of the fuel-air mixture.

5. Method according to claim 1, wherein the outlet valve is opened after the start of the ignition of the fuel-air mixture.

6. Method according to claim 1, wherein the outlet valve is opened after the end of the combustion of the fuel-air mixture.

7. Method according to claim 1, wherein the outlet valve is opened simultaneously with the start of ignition of the fuel-air mixture.

8. Method of operating an engine having a plurality of cylinders for optimizing regeneration of an exhaust treatment device, comprising:
   operating at least one of the cylinders as unfired without supplying the fuel-air mixture thereto;
   opening an outlet valve when a piston of said at least one of the cylinders is proximal to an upper compression dead center of the piston to increase temperature in an exhaust pipe; and
   operating at least one other of the cylinders in a fired manner by supplying a fuel-air mixture thereto with the outlet valve of said at least one of the other cylinders being held essentially in its closed position during a compression stroke.

9. Method according to claim 1 further comprising carrying out additional measures for regenerating the exhaust treatment device during regeneration of an exhaust treatment device.

10. Method according to claim 9, wherein, after the opening of the outlet valve, fuel is injected into the at least one unfired cylinder.

11. Method according to claim 1 wherein said operation is carried out during an idling or at points in time of a low load of the internal-combustion engine.

12. Method according to claim 8 further comprising carrying out additional measures for regenerating the exhaust treatment device during regeneration of an exhaust treatment device.

13. Method according to claim 8, wherein, after the opening of the outlet valve, fuel is injected into the at least one unfired cylinder.

14. Method according to claim 2, wherein the fuel-air mixture in the cylinder is ignited at the earliest 40° before the upper compression dead center of the piston and at the latest 40° after the upper compression dead center of the piston.

15. Method according to claim 2, wherein the outlet valve is opened before the start of the ignition of the fuel-air mixture.

16. Method according to claim 2, wherein the outlet valve is opened after the start of the ignition of the fuel-air mixture.

17. Method according to claim 2, wherein the outlet valve is opened after the end of the combustion of the fuel-air mixture.

18. Method according to claim 2, wherein the outlet valve is opened simultaneously with the start of ignition of the fuel-air mixture.

* * * * *